United States Patent [19]

Knispel et al.

[11] Patent Number: 5,210,956
[45] Date of Patent: May 18, 1993

[54] RETRACTABLE TAPE MEASURE

[75] Inventors: Barry Knispel, Hillsdale, N.J.; Sandor Goldner, Brooklyn, N.Y.

[73] Assignee: Arrow Fastener Company, Inc., Saddle Brook, N.J.

[21] Appl. No.: 845,255

[22] Filed: Mar. 3, 1992

[51] Int. Cl.⁵ .............................................. G01B 3/10
[52] U.S. Cl. ....................................... 33/761; 33/767; 33/770
[58] Field of Search .................. 33/767, 768, 770, 761

[56] References Cited

U.S. PATENT DOCUMENTS

| | | | |
|---|---|---|---|
| 1,542,990 | 6/1925 | Tomasso | 33/770 X |
| 4,153,996 | 5/1979 | Rutty | 33/767 |
| 4,748,746 | 6/1988 | Jacoff | 242/107.2 X |
| 4,938,430 | 7/1990 | Chadin | 33/767 |
| 5,077,911 | 1/1992 | Wedemeyer | 33/770 |

*Primary Examiner*—Thomas B. Will
*Attorney, Agent, or Firm*—Fitzpatrick, Cella, Harper & Scinto

[57] ABSTRACT

A retractable tape measure assembly is disclosed which includes a housing, a coiled tape located in the housing, which tape is adapted to be extended from and retracted into the housing. The coiled tape has a free end with a pull tab secured thereto. A resilient bumper is mounted in the housing in position to contact the pull tab when the tape is retracted. The bumper includes a front surface for contacting the pull tab and a tape support surface behind the front surface extending generally perpendicular thereto. An integral spring is located behind the tape support surface and engages a stop in the housing so that when the tape is retracted the spring is compressed to absorb the stress in the tape. The casing also includes a tape lock mechanism for locking the tape in an extended position. The pull tab also has a rear surface on which a high friction element is placed to help hold the pull tab in position when the tape is extended and engaged with a work piece for measurement.

14 Claims, 3 Drawing Sheets

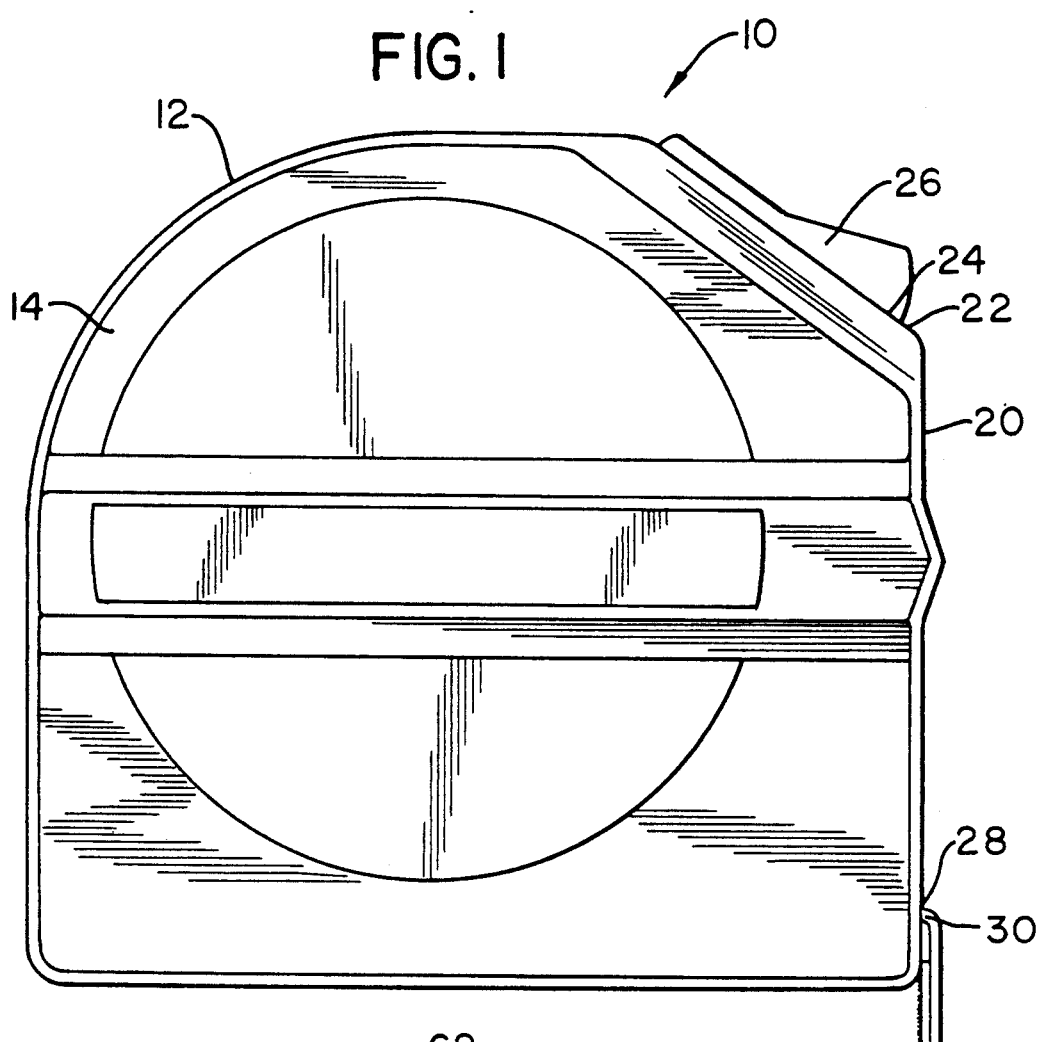
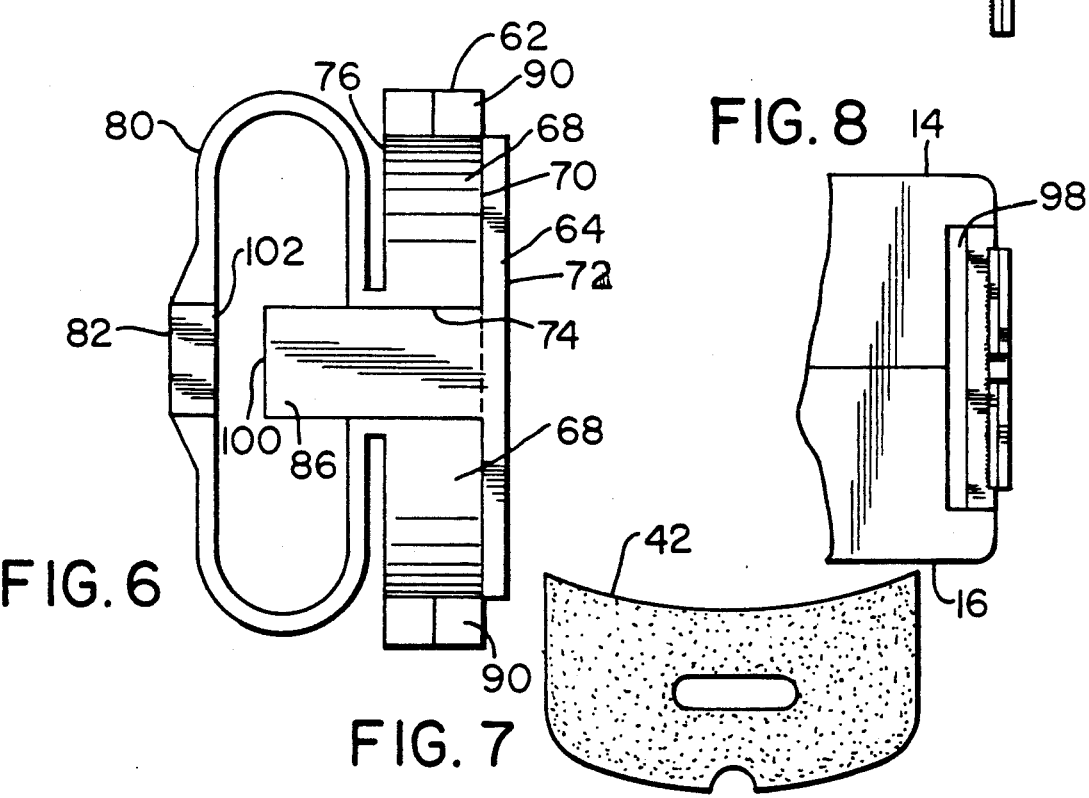

5,210,956

RETRACTABLE TAPE MEASURE

The present invention relates to retractable measuring tapes, and more in particular to an improved measuring tape having improved bumper and tape lock mechanisms.

Retractable tape measures have been commercially available for many years. These tapes generally are formed as a steel coiled tape contained within a plastic or metal casing with a coiled spring mounted within the coiled tape to provide a biasing force that tends to automatically recoil and rewind the tape within the casing. Such tape measure devices have been provided with a variety of auxiliary features, such as for example tape lock mechanisms which, when activated, serve to hold the tape in an extended position against the bias of the recoil spring. Such tape lock mechanisms are shown for example in U.S. Pat. Nos. 4,474,340 and 4,194,703. These mechanisms have all been relatively complex in order to resist the substantial bias force imposed on the tape by the recoil spring.

The recoil spring also produces another problem with retractable tape measures of the above described type. Such tape measures usually have a finger or pull tab at the free end of the tape which extends out of the housing. This tab is generally metal or plastic and L shaped, with one leg secured to the free end of the tape and any other extending perpendicular thereto. The free perpendicular leg is used by the craftsman to engage a work piece and hold the free end thereof while the tape is retracted to the point at which a measurement is to be taken. After the measurement is completed the free end of the pull tab is released and the tape is permitted to automatically retract. Upon retraction, the free end of the pull tab impacts against the front edge of the casing. This impact, under the substantial force of the recoil spring, has been known to cause damage to the pull tab and/or the free end of the tape at the point where the pull tab is connected to the tape. Of course, without the pull tab, the tape would be completely retracted into the housing and the functionality of the tape destroyed. In order to overcome this problem a number of previously proposed bumper arrangements have been suggested which will serve to absorb the impact of tape retraction. Such devices include a simple resilient bumper mounted in the free end of the casing. In a more complex arrangement the bumper shown in U.S. Pat. No. 4,479,617 an aperture is formed in the bumper increase its resilience. Another bumper having an integral spring in a very complicated arrangement has also been suggested, as disclosed in U.S. Pat. No. 4,748,746.

It is an object of the present invention to provide an improved retractable tape measure which is relatively simple to manufacture and durable in use.

Another object of the present invention is to provide a retractable tape measure having an improved tape locking mechanism.

Yet another object of the present invention is to provide an improved retractable tape measure having an improved bumper mechanism for protecting the pull tab of the tape and the end of the tape during impact upon retraction of the tape.

A still further object of the present invention is to provide a tape measure having a friction surface on the pull tab in a relatively simple and inexpensive manner to insure positive engagement of the pull tab with a work piece during use.

In accordance with an aspect of the present invention a retractable tape measure assembly is provided which includes a housing, a coiled tape mounted in the housing for extension and retraction therefrom under the bias of a coiled spring. A free end of the coiled tape extends from the housing and has a pull tab secured thereto.

A resilient bumper is mounted in the housing for contact by the pull tab when the tape is retracted into the housing. The bumper includes a front surface for contacting the pull tab upon retraction of the tape and a tape support surface, behind the front surface. An integral spring element is formed as part of the bumper, behind the support surface. That spring engages a stop formed in the base of the housing so that when the tape is retracted the spring is compressed to absorb stress from the pull tab. The tape measure also includes a lock mechanism formed by a lock element slidably mounted in the casing for movement by a finger actuator. The slide element includes resilient extension tabs which cooperate with corresponding tabs formed adjacent to its path of travel on the interior surface of the housing. These tabs snap fit over each other to lock the slide element in a downward position, against the tape, to hold the tape against the support surface of the bumper in an extended position.

Finally, the pull tab or hook has an adhesive strip of material which includes an abrasive surface secured thereto in order to provide a positive engagement between the tape hook or pull tab and a work piece.

The above, and other objects, features and advantages of this invention will be apparent to those skilled in the art in the following detailed description of an illustrative embodiment thereof, which is to be read in connection with the accompanying drawings, wherein:

FIG. 1 is a side elevational view of a retractable tape measure constructed in accordance with the present invention;

FIG. 6 is a plan view of the bumper mechanism of the present invention;

FIG. 7 is a rear view of the depending tape hook or pull tab showing the abrasive surface thereon; and FIG. 8 is a bottom view of the front end of the tape casing.

Figure 2:
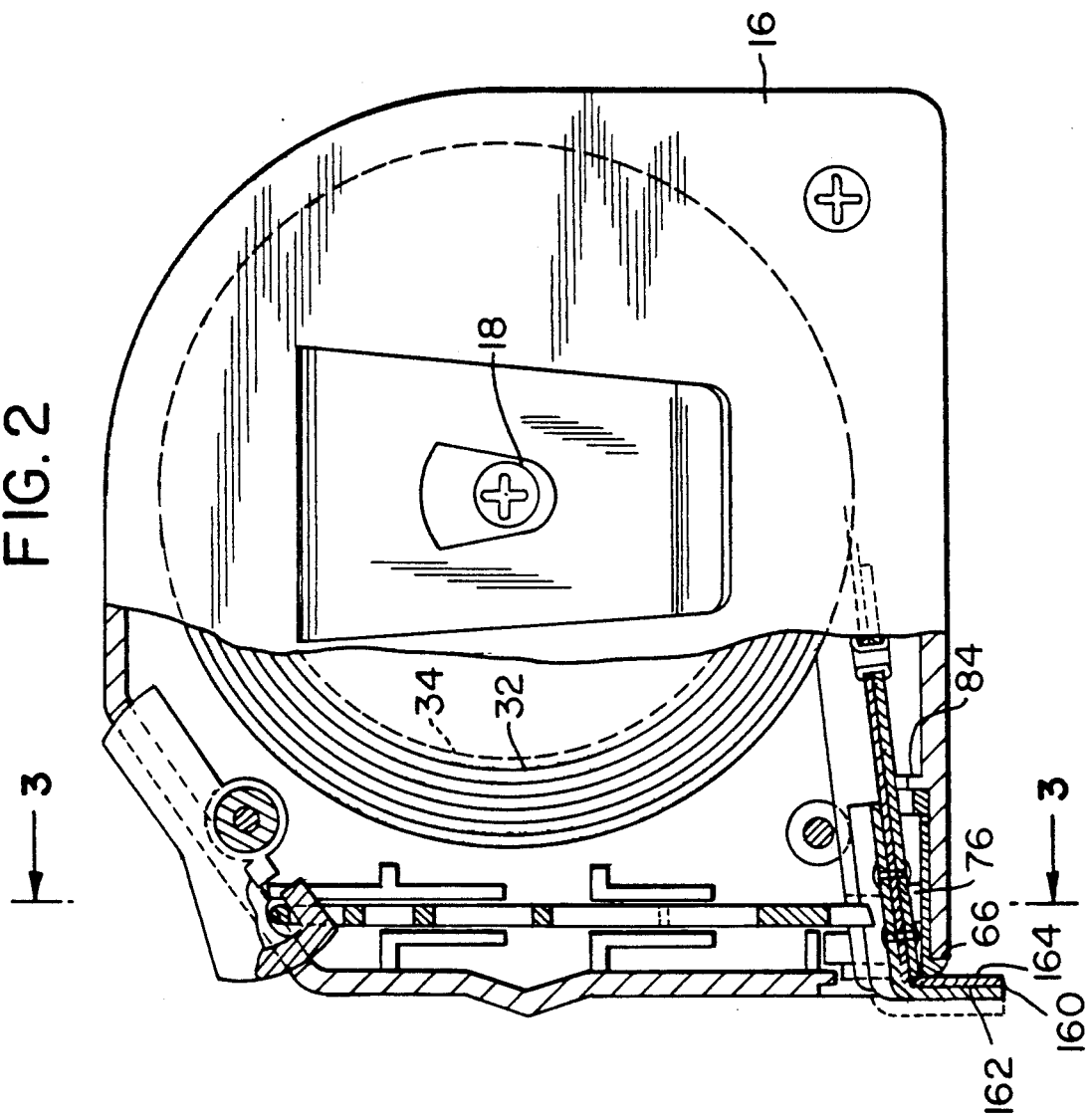
FIG. 2 is a side view of the opposite side of the tape measure from that shown in FIG. 1, with parts broken away to illustrate the internal mechanism.

Referring now to the drawings in detail, and initially to FIG. 1 thereof, a retractable tape measure 10 constructed in accordance with the present invention is illustrated. The tape measure includes a housing 12 formed of two half casing elements 14, 16, of generally identical internal configuration, but with the external configuration of each side being different, as can be seen from a comparison of FIGS. 1 and 2. The casing halves are secured together by screws 18 in a known manner. The two halves of the casing define a front end 20 including an upper inclined top wall section 22. Wall 22 has an opening 24 formed therein through which a finger actuator member 26 of the tape lock mechanism extends.

The lower end of front wall 22 includes an opening 28 formed therein through which the tape 30 can be extended and retracted. Tape 30 is formed as a coiled steel number in any known manner. The tape is coiled about a hub 32 and its inner end is secured to the hub in any convenient manner. A coiled spring 34, schematically illustrated in FIG. 2, is located within hub 32 and its inner end is connected to a central shaft defined in the housing at the location illustrated by the central screw 18 in FIGS. 2 and 4. This coiled spring operates in the known manner to automatically retract the tape into the casing. Because this mechanism is known, there is no need to describe it in detail.

Figure 3:
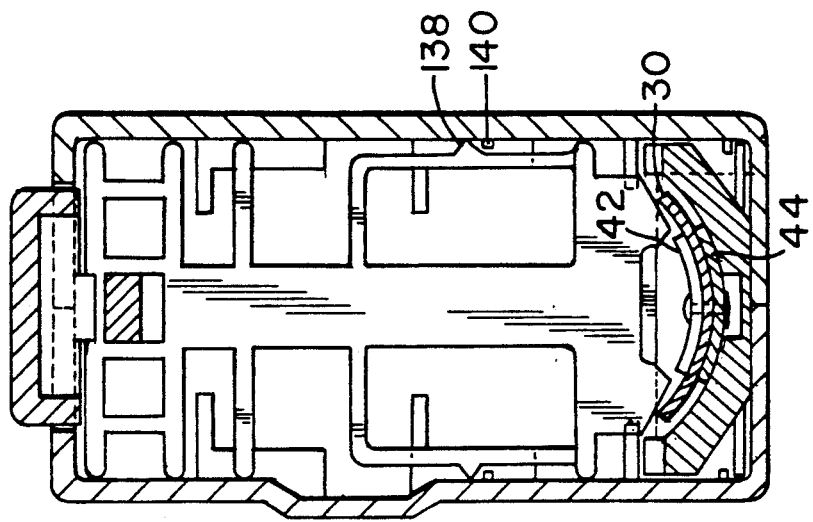
FIG. 3 is a sectional view taken along lines 3—3 of FIG. 2.

Tape 30 has a free end 36 to which a finger tab or pull tab 38 is secured. Pull tab 38 is formed of metal in a generally L shape. It includes a first depending leg 40 and a second securement leg 42 which is concave, as seen in FIGS. 3 and 7, to conform to the generally concave shape of the tape. In addition, a backing or reinforcement member 44, formed of metal, is provided on the lower surface of tape 30 with the respect to leg 42. Reinforcing plate 44 is also concave, as seen in FIG. 3, to conform generally to the curvature of tape 30.

Tape hook 38 and reinforcing plate 44 are secured to the free end 36 of tape 30 by a pair of rivets 46. Preferably, the end 36 of tape 30 has slightly elongated holes formed therein at the position of the rivets 46, to permit the pull tab 38 to achieve a zero position when the rear surface 50 of the pull tab is placed against a work piece. This feature, as is known in the art, permits the pull tab to define a "zero" position at either its front or rear surface, depending upon which surface is in contact with the work piece.

Reinforcing plate 44 is slightly longer than leg 42 of pull tab 38, and its inner end is secured to the tape 30 by an eyelet 52. The eyelet defines a hole in the tape so that a pencil or a nail may be inserted therein to aid in scribing or forming circles with the tape measure.

Figure 4:
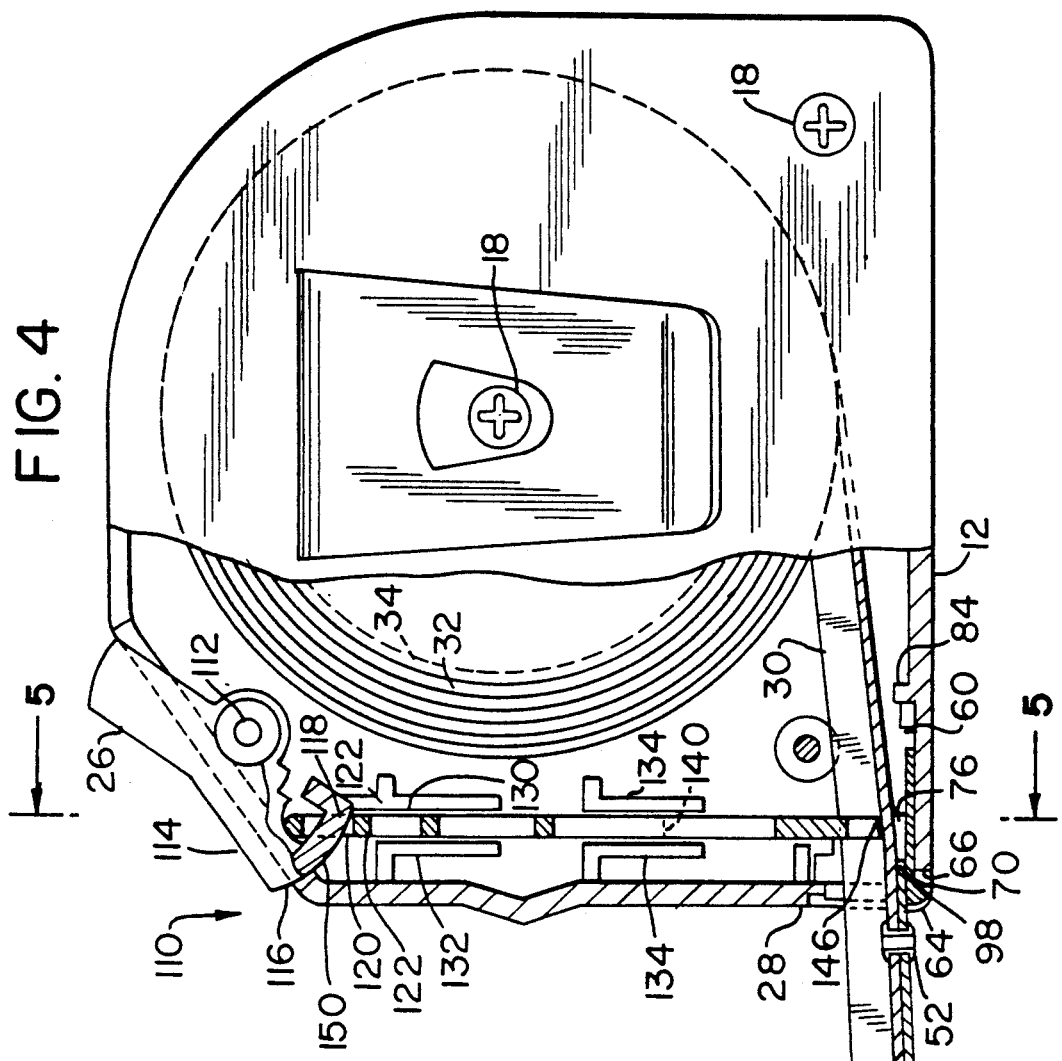
FIG. 4 is a side view similar to FIG. 2 showing the tape lock mechanism in its locked position.
Figure 5:
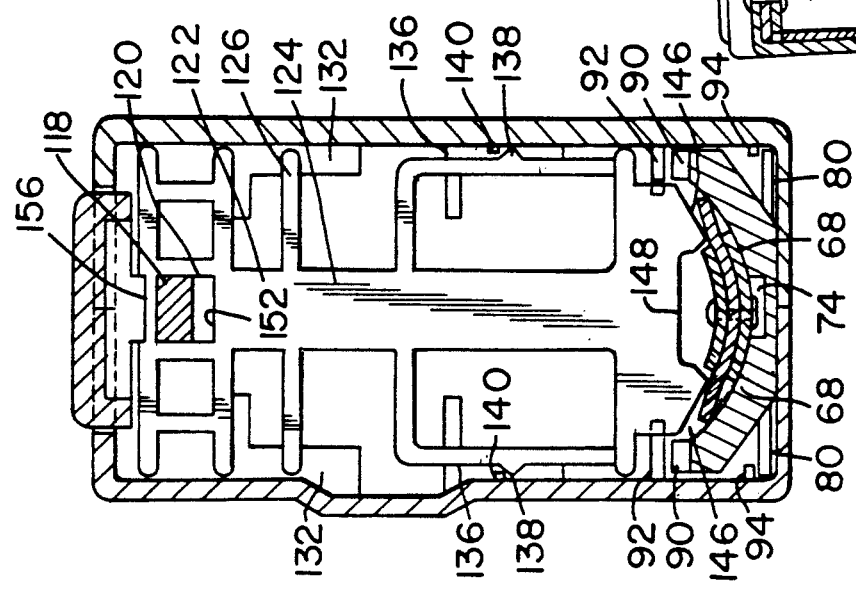
FIG. 5 is a sectional view taken along line 5—5 of FIG. 4.

In order to cushion the impact of tape hook 38 against the front edge of the casing upon retraction of the tape, a bumper mechanism 60 is provided in the opening 28 at the front of the housing. The bumper mechanism consists of a one-piece bumper and spring element 62, as illustrated most clearly in FIG. 6. Bumper 62 includes a front bumper leg 64 which extends downwardly over the front edge 66 of casing 12, at opening 28. A tape support surface 68 extends generally perpendicularly from leg 64 inwardly of the housing. The support surface includes a front edge 70 located inwardly from the front surface 72 of leg 64 and is stepped up, as seen in FIGS. 2 and 4, to define the surface 68. The surface 68 has a recess or channel 74 formed therein, as seen in FIGS. 3 and 5, to permit passage of the rivets and eyelet. Surface 68 is inclined slightly upwardly from surface 70 to its rear surface 76. This inclination generally conforms to the tangent angle of the tape as it leaves the tape hub to pass through opening 28. This surface provides better cooperation with the tape locking mechanism to be described hereinafter as compared to previously proposed arrangements.

An integral generally oval spring 80 is formed as part of the bumper mechanism, behind support surface 68. The spring has a central rearwardly located enlarged flat section 82, which is engaged with a stop 84 formed in casing 12 when the bumper mechanism is properly positioned in the casing during assembly. In addition, the flat section 82 of spring 80 is located opposite an extension 86 of support surface 68. This serves to prevent excessive compression of the spring upon retraction of the tape. Finally, tape support surface 68 includes extensions 90 at its side edges, as seen most clearly in FIGS. 3 and 5. These extensions are positioned beneath stops 92 formed in the housing so that the bumper cannot twist in the housing during retraction and is held firmly in place. Likewise extensions 94 in the housing (see FIG. 5) are located above oval spring 80 to aid in securing the bumper mechanism in a fixed position within the two halves of the housing.

Front leg 64 of the bumper mechanism has a rear surface 98, as seen most clearly in FIG. 8. In the normal position of the bumper the rear surface 98 of the leg 64 is spaced from the edge 66 of the casing, as seen in FIG. 4. Upon retraction of the tape into the casing, the rear end 50 of the tape 38 is forcibly engaged with the leg 64 of the bumper, under the influence of the spring 34. As described above, this impact could damage the end of the tape. However, in accordance with the present invention damage is avoided because spring 80 is compressed upon this impact to absorb the shock of the impact. Compression of spring 80 causes the surface 98 to move to the right, as seen in FIG. 4, into the position shown in FIG. 2 adjacent to surface 66. As spring 80 compresses the rear surface 100 of extension 86 will ultimately contact surface 102 of flat element 82 to prevent further compression of the spring. The space between the surfaces 100 and 102 is designed to be slightly smaller than the space between the surfaces 98 and 66, so that the bumper is not driven against the casing, but all of the impact is absorbed by the spring and the mounting for the spring. This arrangement insures against damage to the hook and tape.

In order to lock tape 30 in the extended position shown in FIG. 4, a tape lock mechanism 110 is provided. This mechanism includes the actuator rocker 26. This rocker is pivotly mounted on a post 112 between the casing halves 14, 16 in any convenient manner. The rocker has exposed surfaces 114 which are engaged by the operator to move the rocker between the position shown in FIG. 2 (the unlocked position) and the position shown in FIG. 4 (the locked position).

The lower end 116 of rocker 26 includes a hook member 118 integrally formed therewith. Hook member 118 is engaged in an opening 120 formed in the locking or slide plate 122 as seen most clearly in FIGS. 3 and 5. Slide 122 includes a central relatively rigid plastic structural element 124 and a plurality of extension guides 126 which extend from element 124. The free ends of extensions 126 ride in a track 130 defined between pairs of opposed walls 132 extending inwardly from the respective halves of the housing. A similar pair of walls 134 on either housing half guide the rib members 136 formed on opposite sides of bar 124, as seen in FIGS. 3 and 5.

Ribs 136 include extensions 138 formed thereon. These extensions are positioned to override internally extending bars 140 formed in the tracks defined by the walls 134. The cooperation between the extensions 138 and the walls 140 provide the locking mechanism as described hereinafter.

The lower end of slide 122 defines a pair of locking surfaces 146 located on opposite sides of the slot 148. The slot 148 permits the leg 42 of the hook 38 to enter the casing as seen in FIGS. 3 and 5. The surfaces 146 are positioned to engage the tape and hold it against the support surface 68 of the bumper. Preferably the lower end 146 of slide 122 is tapered, as seen in FIGS. 2 and 4, at an angle which corresponds to the angle of the taper of the surface 68, so that when slide element 22 is moved to the locked position, the tape fits securely between the slide element and the surface 68, without kinking.

Slide lock element 12 is moved by rotation of the actuator 26 from the position shown in FIG. 2 to the position shown in FIG. 4. This movement causes the cam surface 150 of arm 118 to engage the top 152 of bar 124 and urge the slide downwardly. Downward movement of the slide causes extensions 138 to override walls 140, from the position shown in FIG. 3 to the position shown in FIG. 5. In this position the tape is securely held between surface 146 and surface 68 and is locked in its extended position.

Upon actuation of the member 26 in the opposite direction, from the position shown in FIG. 4 to the position shown in FIG. 2, rotation of the actuator member causes leg 118 to engage against the upper cross piece 156, and lift the slide element upwardly, again causing tabs 138 to override walls 130. In that position the slide element is held away from the tape to permit free movement thereof. The interference between extensions 138 and walls 140 will prevent the slide from inadvertently moving downwardly until the interference between these elements is forcibly overcome by operation of actuator 26.

In accordance with another feature of the present invention, an improved operation of the retractable tape measure is achieved by the provision of a friction surface 160 formed on the rear surface of tab 40. This friction surface is defined by a stripe material which has an adhesive surface 162 on one side thereof and an abrasive high friction surface 164 on the opposite side thereof which also defines the rear surface 50 of the hook. This type of material is commercially available from 3M Corporation under the tradename NON-SLIP. Equivalent materials may also be used. It has not been previously used for a tape measure applications. Applicant has found that by adhering this material to the rear surface of the tape hook, the abrasive surface is exposed on the rear of the tape hook and will positively engage a work piece when the tape measure is used by positioning the work piece against the rear surface 50 of the hook. This arrangement will hold the hook firmly against the work piece and prevent it from slipping, thereby overcoming a serious problem in the use of retractable tape measures such as have been previously proposed.

In lieu of a strip material adhered to rear surface 50, a granulate or particulate material such as sand or other granular material may be adhered to the surface 50 by a suitable epoxy adhesive or the like.

Although an illustrative embodiment of the present invention has been described here and with reference to the accompanying drawings, it is to be understood that various changes and modifications can be effective therein without departing from the scope or spirit of this invention.

What is claimed:

1. A tape measure assembly comprising a housing, a coiled tape mounted in the housing and adapted to be extended therefrom, said coiled tape having a free end extending from the housing, a pull tab secured to said free end of the tape, and a bumper mounted in the housing for contact by said pull tab when the tape is retracted into the housing, said bumper including a front surface for contacting the pull tab, a tape support surface behind said front surface and extending generally perpendicular thereto, an integral generally oval shaped spring behind said support surface, and means for limiting compression of the spring, said housing including a stop engaging said spring whereby when the tape is retracted the spring is compressed to absorb stress from the tab.

2. A tape measure as defined in claim 1 wherein said support surface and oval spring have a channel formed therein to allow passage of mounting rivets securing the pull tab to the tape.

3. A tape measure as defined in claim 2 wherein said support surface is inclined upwardly from said front surface towards said spring.

4. A tape measure as defined in claim 3 wherein said housing includes means for preventing twisting of said spring in the housing.

5. A tape measure as defined in claim 1 including a locking mechanism for locking the tape against movement into and out of the housing.

6. A tape measure as defined in claim 5 wherein said locking mechanism includes a locking blade slidable mounted in said housing above said bumper; means on the housing for moving said blade towards and away from said bumper, and releasable locking means for locking the blade in its locking position to clamp the tape between the blade and the bumper.

7. A tape measure as defined in claim 6 wherein said bumper and lock blade have cooperating inclined surfaces to prevent kinking of the tape when locked.

8. A tape measure as defined in claim 1 including friction means on the pull tab.

9. A bumper for a retractable tape measure including a tape with a free end and a pull tab at the free end of the tape comprising a front surface, a tape support surface behind the front surface and extending generally perpendicularly thereto; and spring means behind the tape support surface for permitting the front surface to move and absorb shocks upon retraction of the tape; said spring means including an integrally formed generally oval shaped member.

10. A bumper as defined in claim 9 including integral means for limiting compression of said oval spring.

11. A bumper as defined in claim 10 wherein said support surface is inclined upwardly from said front surface towards said spring.

12. A bumper as defined in claim 9 wherein said support surface and oval spring have a channel formed therein to allow passage of mounting rivets securing the pull tab to the tape.

13. A tape measure assembly comprising a housing, a coiled tape mounted in the housing and adapted to be extended therefrom; a bumper guide mounted on said housing in the path of travel of the tape during extension and retraction, said bumper guide having a tape support surface beneath the path of travel of the tape, and a locking mechanism for locking the tape against movement into and out of the housing, said locking mechanism including a locking blade slidably mounted in said housing above said bumper, means on the housing for moving the blade towards and away from said bumper, and releasable locking means for locking the blade in its locking position to clamp the tape between the blade and the bumper; said locking blade having a free end opposite said support surface and said locking blade free end and said support surface having cooperating inclined surfaces to prevent kinking of the tape when locked.

14. A tape measure as defined in claim 13 wherein said releasable locking means comprises at least one protrusion on said housing extending toward said blade and a cooperation protrusion on the blade facing the housing and overlapping the housing protrusion when viewed in plan, wherein said protrusions interfere with blade movement and can override each other to lock the blade in locked or unlocked positions.

* * * * *